Sept. 27, 1966     K. W. LANGE     3,274,785
APPARATUS FOR PREVENTING ICE AND FROST FORMATION
UNDER LOW TEMPERATURE TANKS
Filed June 19, 1963

INVENTOR.
Kenneth W. Lange
BY
Morrison, Smith & Marshall
Attorneys

United States Patent Office 3,274,785
Patented Sept. 27, 1966

3,274,785
APPARATUS FOR PREVENTING ICE AND FROST FORMATION UNDER LOW TEMPERATURE TANKS
Kenneth W. Lange, Hinsdale, Ill., assignor to Chicago Bridge & Iron Company, Hinsdale, Ill., a corporation of Illinois
Filed June 19, 1963, Ser. No. 289,063
2 Claims. (Cl. 61—36)

My invention relates to a method and apparatus for the prevention of ice and frost formation under a storage tank, particularly storage tanks employed in low temperature and cryogenic storage service.

A common occurrence in the use of refrigerated storage tanks used for the storage of normally gaseous liquefied materials such as oxygen, nitrogen, hydrogen, ammonia, methane, propane, and other hydrocarbons is the cooling of the area below the tank foundation to temperatures below the freezing point of water. A direct result of this cooling is the reduction of the vapor pressure in the ground below the foundation and subsequent migration of water vapor to that area. At least part of the water vapor condenses and freezes, creating a force capable of moving or shifting the foundation thereby damaging the tank and destroying its usefulness.

Heretofore, this situation has been remedied by providing a heat source beneath the tank to prevent the moisture from freezing. The great disadvantage in using heating devices, aside from the cost of the heat provided, is their tendency to increase the heat input into the tank, with a consequent increase in load on the refrigerating unit.

In accordance with this invention, frost and ice formation is prevented by pumping a water vapor-free gas (hereafter called "dry gas") into conduits strategically placed under the tank. The dry gas is released through nozzles into the ground in order to increase the pressure under the tank and frustrate the migration of moisture to the area.

Figure 1:
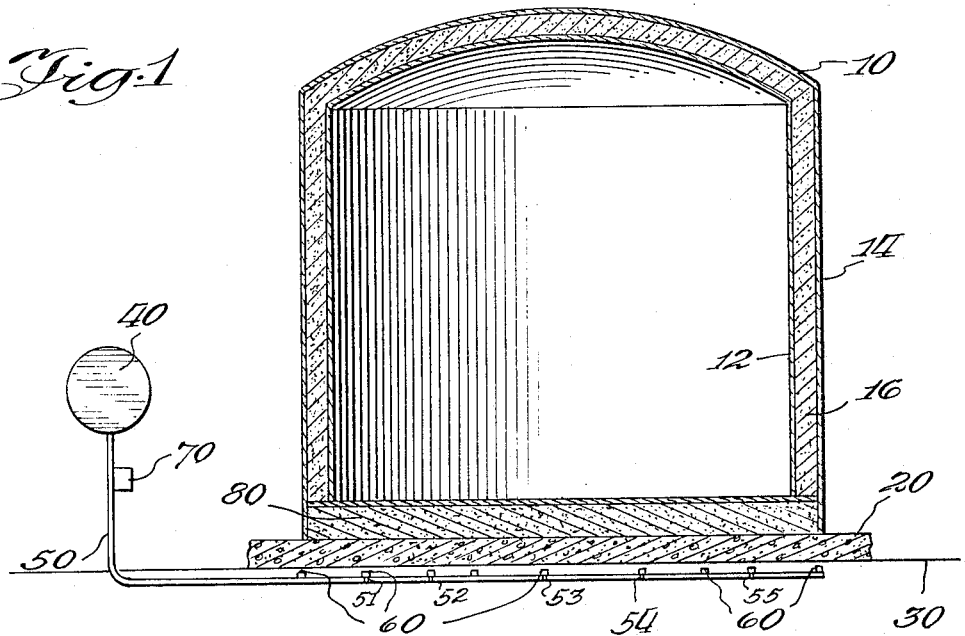
Figure 2:
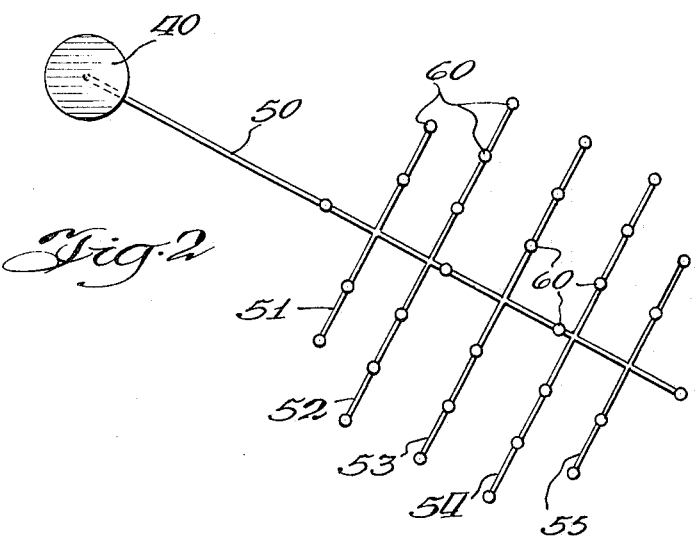

Further objects and advantages of the present invention will be apparent from the following description, reference being had to the accompanying drawings wherein:

FIGURE 1 shows a plan view of the device described and claimed herein; and
FIGURE 2 is a top view of that device.

Referring to FIGURES 1 and 2, a tank 10 for use in the storage of normally gaseous liquefied substances and having a wall 12 and an outer jacket or vapor barrier 14 between which is placed an insulating material 16 is shown on its foundation 20. The tank is insulated from the subgrade by insulation 80. The foundation 20, which may consist of concrete blocks or a pad of sand or gravel, rests directly on the ground surface 30. A dry gas furnishing means 40 such as a dehumidifier supplies gas that is substantially free of water vapor, which in the preferred embodiment may be dry air, directly to the main conduit 50. Additional branch conduits 51, 52, 53, 54 and 55 are connected to the main conduit 50 for efficient air distribution.

The dry gas is discharged through the nozzles 60 attached to the main conduit 50 and branch conduits 51, 52, 53, 54 and 55 to the area beneath the foundation 20. In a specific embodiment of the present invention a pressure sensing device 70 is attached to the dehumidifier 40 to maintain the pressure beneath the foundation 20 at a predetermined level, sufficient to prevent migration of water vapor to the area directly below the tank foundation.

In an alternative embodiment of the present invention the dry gas furnishing means 40 is a generator for supplying a dehumidified gas such as nitrogen or freon to the conduits located beneath the foundation 20.

A relatively heavy gas is preferred to prevent the rapid diffusion of the dry gas to the atmosphere, particularly where the tank is built on a pervious material such as sand or loose gravel.

The pressure beneath the tank must be maintained at a level slightly above atmospheric pressure whether dry air or other dry gases are used. When the pressure of the dry gas falls below atmospheric pressure, migration of water vapor occurs.

The foregoing description has been given for clearness of understanding only, no limitations being implied, as modifications will be obvious to those skilled in the art.

What is claimed is:
1. Apparatus for the prevention of frost and ice formation below a storage tank comprising:
    a plurality of conduits arranged in the ground surface below said tank;
    means for generating a substantially dry gas;
    a plurality of nozzles secured to said conduits through which said dry gas is emitted; and
    means for introducing said dry gas into said conduits and maintaining the pressure of said dry gas below said tank at a level above the ambient atmospheric pressure.
2. The apparatus described in claim 1 wherein:
    said dry gas is dehumidified air; and
    said means for generating the dry gas is a dehumidifier.

References Cited by the Examiner
UNITED STATES PATENTS

| | | | |
|---|---|---|---|
| 1,952,162 | 3/1934 | Gee et al. | 61—36 |
| 2,332,227 | 10/1943 | Jackson. | |
| 2,363,018 | 11/1944 | Poulter | 61—36 |
| 2,520,883 | 8/1950 | Korenemann et al. | 220—18 X |
| 3,196,622 | 7/1965 | Smith et al. | |

EARL J. WITMER, *Primary Examiner.*